US007748261B2

(12) United States Patent
Sakayanagi

(10) Patent No.: US 7,748,261 B2
(45) Date of Patent: Jul. 6, 2010

(54) TORQUE ESTIMATION DEVICE FOR INTERNAL COMBUSTION ENGINE

(75) Inventor: Yoshihiro Sakayanagi, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 93 days.

(21) Appl. No.: 12/282,582

(22) PCT Filed: Jan. 15, 2008

(86) PCT No.: PCT/JP2008/050323

§ 371 (c)(1), (2), (4) Date: Sep. 11, 2008

(87) PCT Pub. No.: WO2008/087928

PCT Pub. Date: Jul. 24, 2008

(65) Prior Publication Data

US 2009/0100920 A1 Apr. 23, 2009

(30) Foreign Application Priority Data

Jan. 16, 2007 (JP) ............................ 2007-006899

(51) Int. Cl.
*G01M 15/00* (2006.01)

(52) U.S. Cl. ................................ 73/114.15; 73/114.63

(58) Field of Classification Search ............. 73/114.15, 73/114.63
See application file for complete search history.

(56) References Cited

U.S. PATENT DOCUMENTS

| | | | | |
|---|---|---|---|---|
| 5,200,899 | A * | 4/1993 | Ribbens et al. | 701/111 |
| 5,239,473 | A * | 8/1993 | Ribbens et al. | 701/111 |
| 5,452,207 | A * | 9/1995 | Hrovat et al. | 701/1 |
| 5,485,374 | A * | 1/1996 | Takaku et al. | 701/29 |
| 5,906,652 | A * | 5/1999 | Remboski et al. | 701/110 |
| 5,947,087 | A * | 9/1999 | Minowa et al. | 123/399 |
| 6,725,709 | B2 * | 4/2004 | Takaku et al. | 73/114.03 |
| 6,975,934 | B2 * | 12/2005 | Ishikawa et al. | 701/111 |
| 7,133,766 | B2 * | 11/2006 | Kokubo | 701/114 |
| 7,596,446 | B1 * | 9/2009 | Sakayanagi et al. | 701/105 |
| 2004/0193360 | A1 | 9/2004 | Ishikawa et al. | |
| 2005/0193804 | A1 * | 9/2005 | Kokubo | 73/35.12 |

FOREIGN PATENT DOCUMENTS

| | | |
|---|---|---|
| JP | 63 47544 | 2/1988 |
| JP | 3 294636 | 12/1991 |
| JP | 7-247894 | 9/1995 |
| JP | 7-259627 | 9/1995 |
| JP | 11 22504 | 1/1999 |

(Continued)

*Primary Examiner*—Lisa M Caputo
*Assistant Examiner*—Freddie Kirkland, III
(74) *Attorney, Agent, or Firm*—Oblon, Spivak, McClelland, Maier & Neustadt, L.L.P.

(57) ABSTRACT

An internal combustion engine torque estimation device that accurately estimates the torque of an internal combustion engine without being affected by engine speed changes. A reference signal, which is output at predetermined rotation angle intervals of a crankshaft for the engine, is acquired. In accordance with the reference signal, the amount of change in the rotation speed of the crankshaft is acquired as a rotational fluctuation. A filtering process is performed on the rotational fluctuation in synchronism with reference signal output timing to extract a frequency component synchronized with a combustion cycle of the engine. The torque of the engine is estimated in accordance with the extracted frequency component.

8 Claims, 4 Drawing Sheets

FOREIGN PATENT DOCUMENTS

| | | |
|---|---|---|
| JP | 2004-92603 | 3/2004 |
| JP | 2004-218470 | 8/2004 |
| JP | 2004 293468 | 10/2004 |
| JP | 2005 105822 | 4/2005 |
| JP | 2005 248909 | 9/2005 |

* cited by examiner

TORQUE ESTIMATION DEVICE FOR INTERNAL COMBUSTION ENGINE

TECHNICAL FIELD

The present invention relates to a torque estimation device for an internal combustion engine, and more particularly to a torque estimation device that is capable of estimating torque in accordance with the rotational fluctuation of the internal combustion engine.

BACKGROUND ART

A prior art device disclosed, for instance, in Japanese Patent Laid-Open No. 2005-248909 detects the combustion status of an internal combustion engine in accordance with the rotational fluctuation of the internal combustion engine. The rotation speed of the internal combustion engine changes in accordance with a combustion cycle. In a low rotation speed region where the engine speed is lower than a predetermined speed, this device detects the combustion status by using the rotational fluctuation amount of a first frequency component synchronized with the combustion cycle of the internal combustion engine. In a high rotation speed region, on the other hand, this device detects the combustion status by using the rotational fluctuation amount of a second frequency component, which is generated, for instance, from the torsion of a crankshaft and higher in frequency than the first frequency component. Therefore, this device detects the combustion status in a wide rotation speed region.

Patent Document 1:

Japanese Patent Laid-Open No. 2005-248909

Patent Document 2:

Japanese Patent Laid-Open No. Hei11-22504

Patent Document 3:

Japanese Patent Laid-Open No. Hei3-294636

Patent Document 4:

Japanese Patent Laid-Open No. Sho63-47544

DISCLOSURE OF INVENTION

Problem to be Solved by the Invention

In the above prior art device, a filtering process is performed to extract predefined frequency components that are necessary for detecting the combustion status from the rotational fluctuation amount. However, since the engine speed changes during an operation of the internal combustion engine, the explosion cycle in the internal combustion engine changes in coordination with the engine speed changes. Therefore, if an attempt is made to perform the filtering process without considering the explosion cycle changes, the predefined frequency components cannot properly be extracted so that the accuracy in torque estimation may decrease.

The present invention has been made to solve the above problem. It is an object of the present invention to provide a torque estimation device that is capable of accurately estimating the torque of an internal combustion engine without being affected by engine speed changes.

Means for Solving the Problem

First aspect of the present invention is an internal combustion engine torque estimation device comprising:

reference signal acquisition means for acquiring a reference signal that is output at predetermined rotation angle intervals of a crankshaft for an internal combustion engine;

rotational fluctuation acquisition means for acquiring a rotation speed change amount of the internal combustion engine as a rotational fluctuation in accordance with the reference signal:

rotation synchronization filtering means for extracting a frequency component synchronized with a combustion cycle of the internal combustion engine by performing a filtering process on the rotational fluctuation in synchronism with the output timing of the reference signal; and torque estimation means for estimating the torque of the internal combustion engine in accordance with the frequency component extracted by the rotation synchronization filtering means.

Second aspect of the present invention is the internal combustion engine torque estimation device according to the first aspect, wherein the torque of the internal combustion engine estimated by the torque estimation means increases with an increase in the rotational fluctuation of the frequency component derived from the filtering process performed by the rotation synchronization filtering means.

Third aspect of the present invention is the internal combustion engine torque estimation device according to the first or the second aspects, wherein the rotational fluctuation acquisition means includes output interval calculation means for calculating output intervals at which the reference signal is output; rotation speed calculation means for calculating the rotation speed of the crank angle in accordance with the output intervals; and rotational change amount calculation means for calculating the amount of change in the rotation speed of the crankshaft.

Fourth aspect of the present invention is the internal combustion engine torque estimation device according to any one of the first to the third aspects, wherein the frequency component removed by the rotation synchronization filtering means contains a frequency component of torque that is generated due to disturbance during a vehicle run.

Fifth aspect of the present invention is the internal combustion engine torque estimation device according to any one of the first to the fourth aspects, wherein the frequency component removed by the rotation synchronization filtering means contains a frequency component of torque that is generated due to mechanical friction in the internal combustion engine.

Sixth aspect of the present invention is the internal combustion engine torque estimation device according to any one of the first to the fifth aspects, further comprising:

first inhibition means for inhibiting the torque estimation means from estimating torque when an automatic transmission with a torque converter having a lock-up function, which is coupled to an output shaft of the internal combustion engine, is locked up.

Seventh aspect of the present invention is the internal combustion engine torque estimation device according to any one of the first to the sixth aspects, further comprising:

second inhibition means for inhibiting the torque estimation means from estimating torque when ignition timing is retarded by an ignition device, which is provided for the internal combustion engine and capable of controlling the ignition timing.

ADVANTAGES OF THE INVENTION

According to the first aspect of the present invention, the torque estimation device, which estimates torque (hereinafter referred to as the "indicated torque") generated upon combustion in an internal combustion engine in accordance with rotation speed pulsations arising out of combustion in the internal combustion engine, extracts a frequency component of the rotation speed fluctuation by performing a filtering process on a rotation speed change amount (hereinafter referred to as the "rotational fluctuation") calculated according to a reference signal of a crankshaft in synchronism with internal combustion engine rotation. While the internal combustion engine operates, an explosion frequency changes in accordance with engine speed changes. The rotation speed pulsations are in synchronism with a combustion cycle. Therefore, when the filtering process is performed in synchronism with internal combustion engine rotation, the frequency component of the rotation speed pulsations can be accurately extracted. Consequently, the present invention makes it possible to accurately estimate the torque of an internal combustion engine without being affected by engine speed changes.

The greater the rotation speed pulsations arising out of internal combustion engine combustion, the greater the resulting explosion, and thus the greater the generated indicated torque. According to the second aspect of the present invention, the greater the rotation speed pulsations, the greater the estimated indicated torque. Therefore, the torque of the internal combustion engine can be accurately estimated.

The third aspect of the present invention calculates the rotation speed in accordance with intervals at which a crank angle reference signal is output, and calculates the rotational fluctuation, which is the amount of change in the rotation speed with respect to time. Therefore, the present invention can calculate the rotational fluctuation in accordance with the crank angle reference signal.

The rotational fluctuation of the internal combustion engine contains various noise components because it is calculated in accordance with the crank angle reference signal. According to the fourth aspect of the present invention, the frequency component of the rotation speed pulsations arising out of internal combustion engine combustion can be accurately extracted because the rotation synchronization filtering means can remove a frequency component of torque that is generated due to disturbance during a vehicle run.

The rotational fluctuation of the internal combustion engine contains various noise components because it is calculated in accordance with the crank angle reference signal. According to the fifth aspect of the present invention, the frequency component of the rotation speed pulsations arising out of internal combustion engine combustion can be accurately extracted because the rotation synchronization filtering means can remove a frequency component of torque that is generated due to mechanical friction between mating parts of the internal combustion engine.

In a situation where the internal combustion engine includes an automatic transmission with a torque converter having a lock-up function, road surface reaction force is directly transmitted to the internal combustion engine while the lock-up function is activated. Therefore, the influence of disturbance increases. While the transmission is locked up, the sixth aspect of the present invention inhibits the estimation of torque. This makes it possible to effectively avoid a situation where the torque is erroneously estimated, and enhance the accuracy in torque estimation.

In a situation where the internal combustion engine is capable of exercising ignition timing control, the waveform of in-cylinder pressure is significantly deformed while the ignition timing is retarded. As a result, the rotation speed pulsations arising out of combustion become unstable. The seventh aspect of the present invention inhibits the estimation of torque while the ignition timing is retarded. This makes it possible to effectively avoid a situation where the torque is erroneously estimated, and enhance the accuracy in torque estimation.

DESCRIPTION OF REFERENCE CHARACTERS

Figure 1:
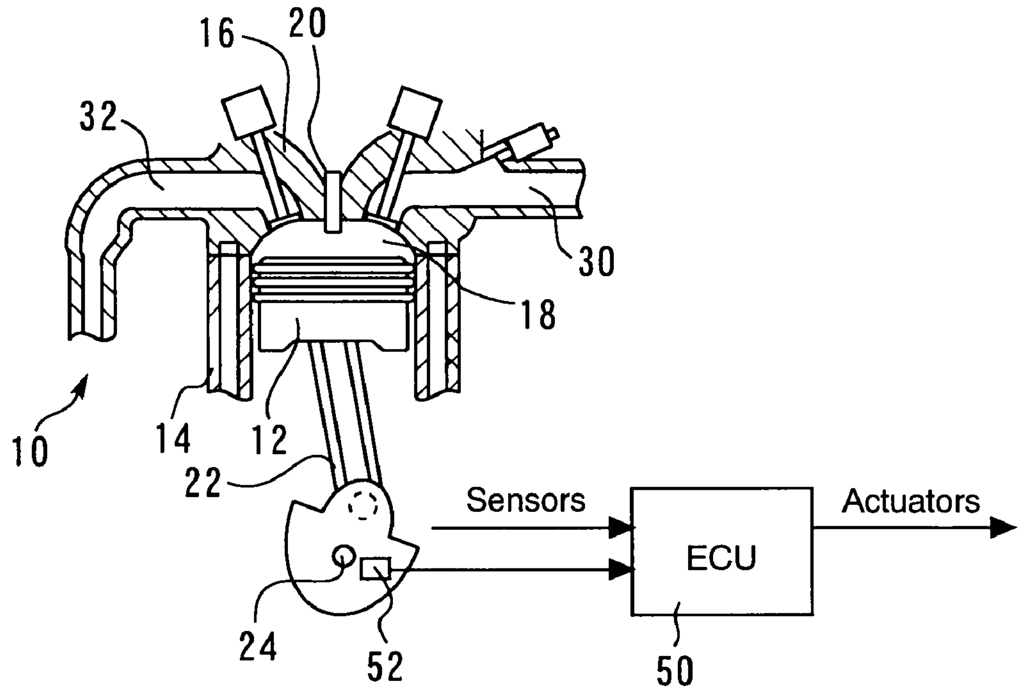
FIG. 1 is a schematic diagram showing the configuration related to the first embodiment of the present invention.

10 internal combustion engine (engine)
12 piston
14 cylinder block
16 cylinder head
18 combustion chamber
33 connecting rod
24 crankshaft
30 intake pipe
32 exhaust pipe
50 ECU (Electronic Control Unit)
52 crank angle sensor
Ti indicated torque
Tl load torque
Tf friction torque
ω angular velocity
dω/dt angular acceleration

BEST MODE FOR CARRYING OUT THE INVENTION

An embodiment of the present invention will now be described with reference to the accompanying drawings. Like elements in the drawings are designated by the same reference numerals and will not be redundantly described. It should be understood that the present invention is not limited to the embodiment described below.

First Embodiment

Configuration of First Embodiment

FIG. 1 is a schematic diagram illustrating the configuration of an internal combustion engine to which a torque estimation device according to a first embodiment of the present invention is applied. The internal combustion engine (engine) 10 according to the present embodiment is a spark-ignition, four-stroke engine. As shown in FIG. 1, the engine 10 includes a cylinder block 14, which contains a piston 12, and a cylinder head 16, which is attached to the cylinder block 14. A combustion chamber 18 is formed by a space that is enclosed by the inner walls of the cylinder block 14 and cylinder head 16 and the upper surface of the piston 12.

The piston 12 is connected to a crankshaft 24 through a connecting rod 22. A crank angle sensor 52 is installed near the crankshaft 24 to generate an output at each predefined crank position.

An intake pipe 30 is connected to the intake end of the engine 10 to acquire air from the atmosphere and introduce it into the combustion chamber 18. An exhaust pipe 32 is connected to the exhaust end of the engine 10 to receive exhaust gas discharged from each cylinder and discharge the exhaust gas into the atmosphere.

A transmission (not shown) is connected to the output shaft of the engine 10. The transmission is an automatic transmission with a torque converter having a lock-up function. An output from the engine 10 is transmitted to driving wheels of a vehicle through the transmission.

An ECU (Electronic Control Unit) 50 exercises overall control over the engine 10. An output section of the ECU 50 is connected to various actuators (not shown). An input section of the ECU 50 is connected to various sensors (not shown) such as the crank angle sensor 52. In accordance with output signals from the plurality of sensors, the ECU 50 exercises overall control over the various actuators, which are related to the operating status of the internal combustion engine.

Operation of First Embodiment

An operation of the present embodiment will now be described with reference to FIGS. 2 and 3. To provide torque control over the engine, it is necessary to detect torque (indicated torque) Ti that is generated upon combustion in the engine 10. An operation performed by the torque estimation device according to the present embodiment to estimate the indicated torque Ti will be described below.

In accordance with the equation of motion, the indicated torque Ti can be expressed by Equation (1) below:

$$Ti-(Tl+Tf)=J\times(d\omega/dt) \quad (1)$$

In Equation (1) above, J denotes the inertia moment of a drive member that is driven due to air-fuel mixture combustion, whereas dω/dt denotes the angular acceleration of the crankshaft 24. Therefore, J×(dω)/dt) represents the net torque of the engine 10 (hereinafter referred to as the "output torque"), which is calculated from the angular acceleration of the crankshaft 24.

Further, Tf denotes the friction torque of a drive section, whereas Tl denotes load torque that is received from the road surface during a vehicle run. The friction torque Tf arises from mechanical friction between mating parts such as the friction between the piston and cylinder inner wall, and includes the torque derived from mechanical friction between accessories. The load torque Tl arises from disturbance based on road surface conditions encountered during a vehicle run. As indicated by Equation (1) above, the friction torque Tf and load torque Tl are torque components that consume the indicated torque Ti.

The output torque J×(dω/dt) can be calculated in accordance with a crank angle signal, which is supplied from the crank angle sensor 52. However, the load torque Tl changes due to a sloped road surface or other external factors, and the friction torque Tf intricately changes due, for instance, to the rotation speed or water temperature of the engine 10. Therefore, it is practically impossible to accurately detect (Tf+Tl) and calculate the indicated torque Ti in accordance with Equation (1) described above.

As such being the case, the present embodiment estimates the indicated torque Ti in accordance with the rotational fluctuation of the output torque. FIG. 2 shows how the indicated torque Ti changes during an operation of the engine 10. This figure indicates that the indicated torque Ti is Tl during the interval between time t0 and time t1 and T2 (>T1) during the interval between time t1 and time t2. As is obvious from FIG. 2, the output torque generated during an operation of the engine 10 pulsates vertically at frequent intervals. When an explosion occurs in the engine 10, the torque drastically increases and then decreases subsequently. For example, in a four-cylinder engine, an explosion occurs in one cylinder after another each time the crankshaft rotates through 180°. In a six-cylinder engine, on the other hand, an explosion occurs in one cylinder after another each time the crankshaft rotates through 120°. Therefore, the indicated torque Ti vertically pulsates in synchronism with crankshaft rotation.

Figure 2:
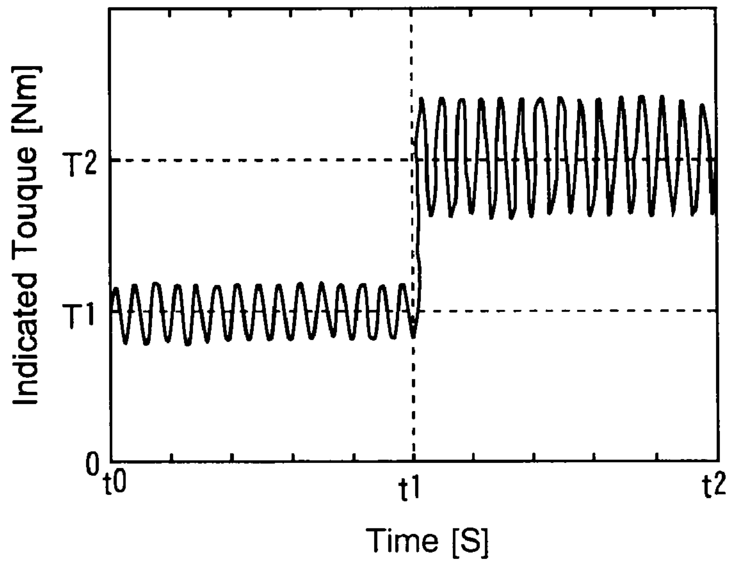
FIG. 2 is a schematic view showing how the indicated torque Ti changes during an operation of the engine 10.
Figure 3:
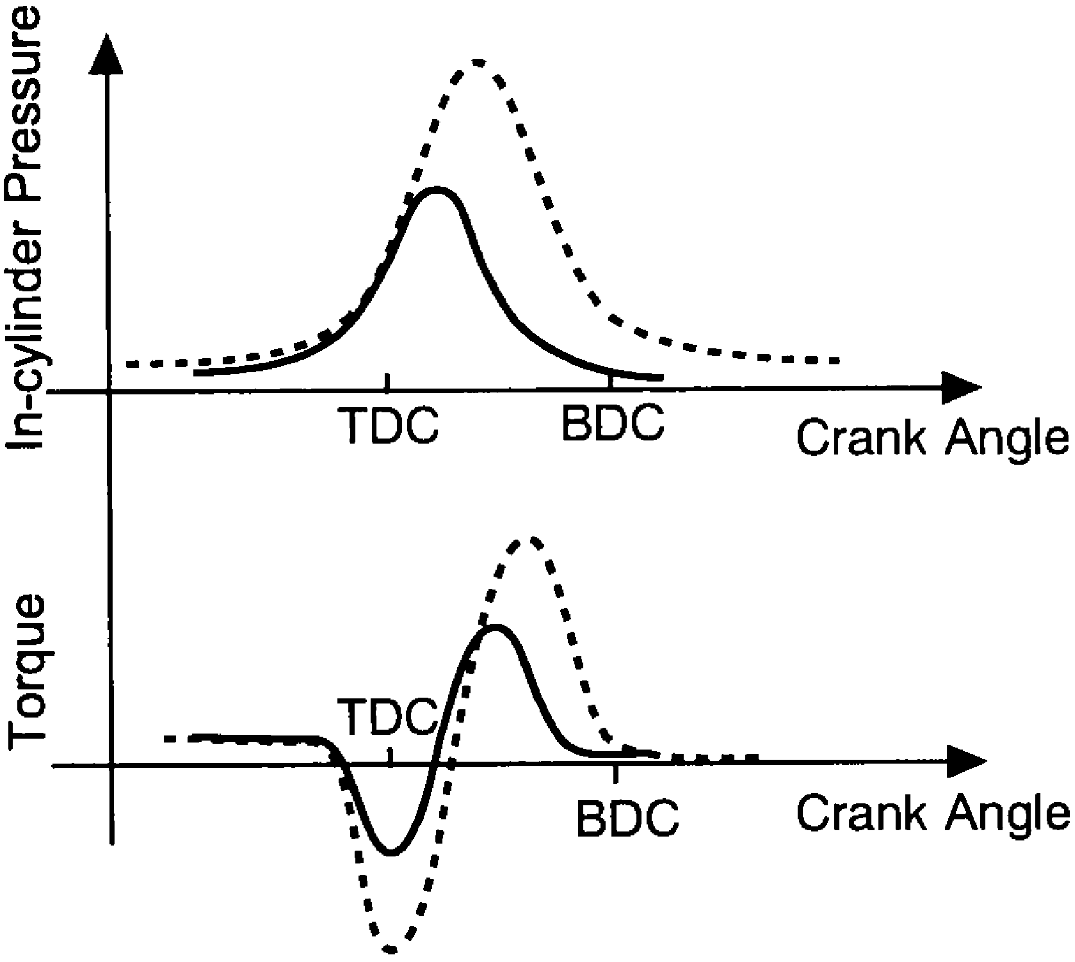
FIG. 3 is a schematic view illustrating the relationship between the combustion cycle of the engine 10 and changes in the indicated torque Ti.

FIG. 2 also indicates that the greater the indicated torque Ti, the greater the amplitude of pulsations. FIG. 3 illustrates the relationship between the combustion cycle of the engine 10 and changes in the indicated torque Ti. More specifically, FIG. 3 shows changes in in-cylinder pressure and indicated torque that are caused by an explosion in one cylinder of the engine 10. As is obvious from this figure, the higher the in-cylinder pressure, that is, the greater the indicated torque, the greater the pulsations of torque. As described above, the magnitude of the indicated torque Ti correlates with the amplitude of pulsations. Therefore, when the amplitude of rotational fluctuation can be accurately detected, the indicated torque Ti can be accurately estimated.

As such being the case, the present embodiment performs a filtering process to extract only the frequency of the above-mentioned rotational fluctuation from the output torque. As mentioned earlier, the frequency component of the combustion-induced pulsations is in synchronism with the explosion frequency of the engine 10. On the other hand, the frequency components of the aforementioned friction torque Tf and load torque Tl do not synchronize with the explosion frequency of the engine 10. Therefore, when the filtering process, which is synchronized with the explosion cycle, is performed, it is possible to effectively extract the frequency of the above pulsations and accurately estimate the indicated torque Ti. More specifically, the following filtering process is performed:

$$F_{fire}[Ti-(Tl+Tf)]=F_{fire}[J\times(d\omega/dt)] \quad (2)$$

In Equation (2) above, $F_{fire}$ denotes a filtering process that extracts only the frequency synchronized with the explosion in the engine 10. The friction torque Tf and load torque Ti are eliminated by the filtering process indicated in Equation (2) because they are not synchronized with the combustion cycle as described above. Further, $F_{fire}$[Ti] is a correlation value of Ti. Therefore, the indicated torque Ti can be expressed by the following equation:

$$Ti=k\times F_{fire}[Ti]=k\times F_{fire}[J\times(d\omega/dt)]=k\times J'\times F_{fire}[d\omega/dt] \quad (3)$$

In Equation (3) above, k is an in-cylinder pressure waveform coefficient, which varies with various status amounts (ignition timing, engine speed, in-cylinder air amount, etc.) related to the combustion status, whereas J' is a coefficient that varies with the status of a motive power transmission system, that is, the range of influence of torque changes. Therefore, the coefficient kJ' is determined in accordance with the engine speed, in-cylinder air amount, ignition retardation amount, and torque converter status.

$F_{fire}$[dω/dt] is a filtering process that is synchronized with a crank angle signal output from the crank angle sensor 52, that is, synchronized with the engine speed. While the engine 10 operates, the explosion frequency changes because the engine speed changes. Therefore, when a time-axis filtering process is performed on the crank angle signal, the frequency synchronized with the explosion in the engine 10 cannot be accurately extracted. Consequently, an angle-axis filtering process is performed on the output crank angle signal. More specifically, a process is performed so that a crank angle signal obtained at sampling intervals θ [deg] passes through a bandpass filter having a frequency range of w1 to w2 [1/deg]. This makes it possible to accurately extract the frequency synchronized with the explosion in the engine 10. Further, the crank angle signal output from the crank angle sensor 52 is a pulse output that is generated at fixed angular intervals. Therefore, the crank angle signal can be directly used for computation purposes with a view toward filtering process simplification and accuracy enhancement.

Details of Process Performed by First Embodiment

Figure 4:
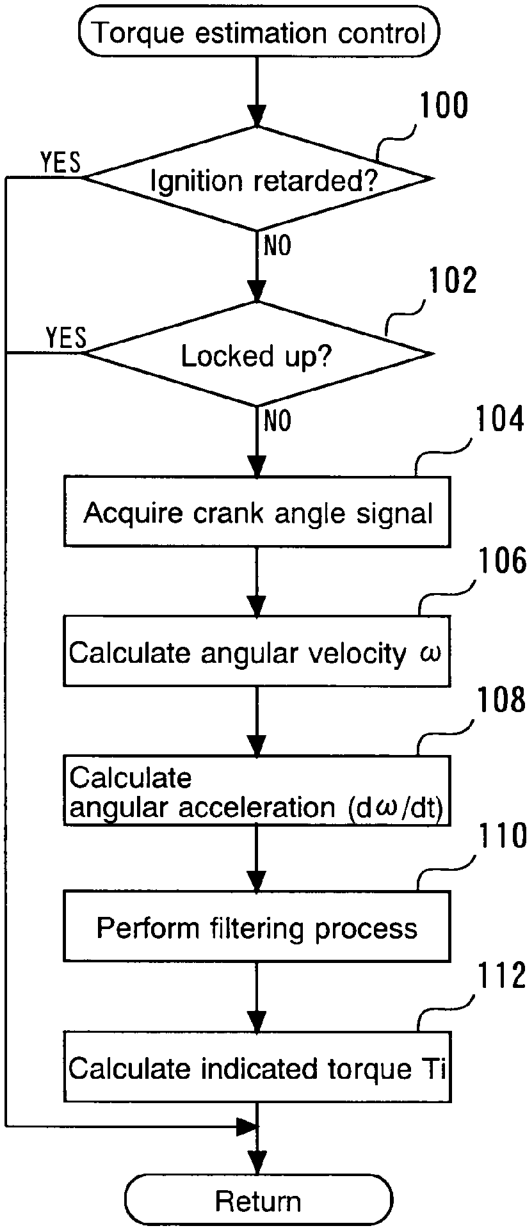
FIG. 4 is a flowchart for a routine executed by the system according to the first embodiment.

A process performed by the present embodiment will now be described in detail with reference to FIGS. 4 to 7. FIG. 4 is a flowchart illustrating a routine that the ECU 50 executes to perform a process for estimating the indicated torque Ti of the engine 10.

First of all, the routine shown in FIG. 4 performs step 100 to judge whether ignition retardation control is being exercised. In the internal combustion engine 10, ignition retardation control is exercised to alleviate shock caused by a gear shift or answer various other requests concerning vehicle control. While ignition retardation control is exercised, combustion-induced rotation speed fluctuation does not periodically take place because the in-cylinder pressure waveform significantly deforms. This may result in an inaccurate estimation of the indicated torque Ti. Therefore, if the judgment result obtained in step 100 indicates that ignition retardation control is being exercised, the routine comes to an immediate end.

If, on the other hand, the judgment result obtained in step 100 does not indicate that ignition retardation control is being exercised, the routine proceeds to the next step. More specifically, step 102 is performed to judge whether the transmission with a torque converter is locked up. While the transmission is locked up, an increased load torque Tl is superimposed on the output torque because the road surface reaction force directly affects the engine 10. Therefore, even when the filtering process indicated by Equation (3) above is performed, the frequency of the load torque Tl cannot be effectively eliminated. Further, the coefficient J' intricately changes. Thus, the indicated torque Ti may not be accurately estimated. Consequently, if it is judged that lock-up control is being exercised over the transmission, the routine comes to an immediate end.

If, on the other hand, the judgment result obtained in step 102 does not indicate that lock-up control is being exercised over the transmission, the routine proceeds to step 104 and acquires a crank angle signal. The crank angle sensor 52 according to the present embodiment outputs a crank angle signal at 10° CA intervals. More specifically, step 104 is performed to acquire the crank angle signal output from the crank angle sensor 52 as needed.

Figure 5:
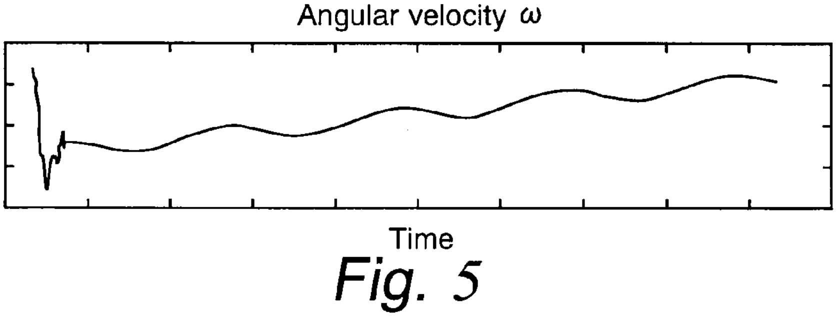
FIG. 5 is a schematic view showing changes in the angular velocity of the engine 10.

Next, step 106 is performed to calculate the angular velocity ω of the crankshaft 24. More specifically, the time interval between the instant at which a crank angle signal is output in step 104 and the instant at which the next crank angle signal output is first calculated. Since the crankshaft 24 rotates through 10° CA during the time interval between the successive crank angle signal outputs, the angular velocity ω of the crankshaft 24 is calculated in accordance with such a relationship. FIG. 5 shows changes in the angular velocity ω of the engine 10. When steps 100 and 102 are successively performed for a predetermined period of time, the angular velocity ω shown, for instance, in FIG. 5 is calculated.

Figure 6:
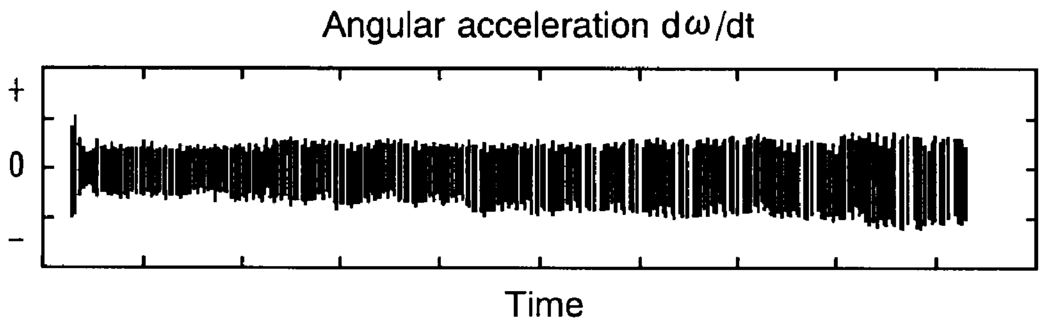
FIG. 6 is a schematic view showing changes in the angular acceleration calculated from the angular velocity shown in FIG. 5.

Next, step 108 is performed to calculate the angular acceleration dω/dt of the crankshaft 24. More specifically, the angular acceleration dω/dt is calculated as the amount of change in the angular velocity ω (calculated in step 106) with respect to time. FIG. 6 shows changes in the angular acceleration dω/dt of the engine 10. FIG. 6 represents a case where the angular acceleration dω/dt is calculated from the angular velocity ω shown in FIG. 5. As indicated in this figure, the frequencies of the friction torque Tf and load torque Ti are superimposed on the angular acceleration dω/dt. Therefore, the indicated torque Ti cannot be estimated from this figure.

As such being the case, the routine shown in FIG. 4 proceeds to step 110 and performs a filtering process on the angular acceleration dω/dt. More specifically, an angle-axis filtering process is performed on the angular acceleration dω/dt calculated in step 108 to extract only the frequency synchronized with the explosion frequency.

Figure 7:
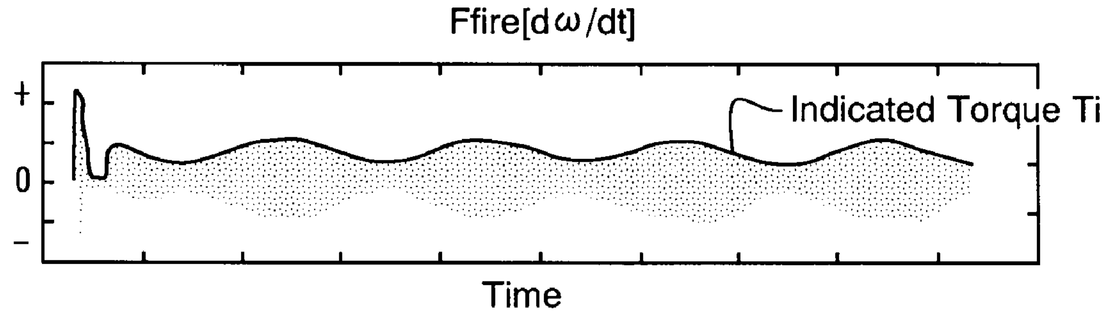
FIG. 7 is a schematic view showing changes in the indicated torque.

Next, step 112 is performed to calculate the indicated torque Ti. More specifically, $F_{fire}$[dω/dt], in-cylinder pressure waveform k, and motive power transmission system status J', which were calculated in step 110, are substituted into Equation (3) above to calculate the indicated torque Ti. FIG. 7 shows the result obtained when $F_{fire}$[dω)/dt], which is obtained when a filtering process was performed on the angular acceleration dω/dt shown in FIG. 6, is multiplied by the constant kJ'. As indicated in FIG. 7, the amplitude of the frequency component extracted in the filtering process is estimated as the indicated torque Ti.

As described above, the present embodiment performs a filtering process in synchronism with the rotation of the engine 10 to effectively extract a frequency component of pulsations synchronized with explosion from the rotational fluctuation of the output torque. This makes it possible to accurately estimate the indicated torque Ti without considering the influence of the friction torque Tf and load torque Tl.

Further, the crank angle signal of the crank angle sensor 52 is a pulse output that is generated at fixed angular intervals. In the filtering process synchronized with the rotation of the engine 10, therefore, the crank angle signal can be directly used for computation purposes with a view toward filtering process simplification and accuracy enhancement.

In the first embodiment, which has been described above, the crank angle signal corresponds to the "reference signal" according to the first aspect of the present invention. Further, the "reference signal acquisition means" according to the first aspect of the present invention is implemented when the ECU 50 performs step 104; the "rotational fluctuation acquisition means" according to the first aspect of the present invention is implemented when the ECU 50 performs step 108; the "rotation synchronization filtering means" according to the first aspect of the present invention is implemented when the ECU 50 performs step 110; and the "torque estimation means" according to the first aspect of the present invention is implemented when the ECU 50 performs step 112.

Further, in the first embodiment, which has been described above, the "output interval calculation means" according to the third aspect of the present invention is implemented when the ECU 50 performs step 106; the "rotation speed calculation means" according to the third aspect of the present invention is implemented when the ECU 50 performs step 106; and the "rotational change amount calculation means" according to the third aspect of the present invention is implemented when the ECU 50 performs step 108.

Furthermore, in the first embodiment, which has been described above, the "first inhibition means" according to the sixth aspect of the present invention is implemented when the ECU 50 performs step 102; and the "second inhibition means" according to the seventh aspect of the present invention is implemented when the ECU 50 performs step 100.

The invention claimed is:

1. An internal combustion engine torque estimation device comprising:

reference signal acquisition means for acquiring a reference signal that is output at predetermined rotation angle intervals of a crankshaft for an internal combustion engine;

rotational fluctuation acquisition means for acquiring a rotation speed change amount of the internal combustion engine as a rotational fluctuation in accordance with the reference signal;

rotation synchronization filtering means for extracting a frequency component synchronized with a combustion cycle of the internal combustion engine by performing a filtering process on the rotational fluctuation in synchronism with the output timing of the reference signal; and torque estimation means for estimating the torque of the internal combustion engine in accordance with the frequency component extracted by the rotation synchronization filtering means.

2. The internal combustion engine torque estimation device according to claim 1, wherein the torque of the internal combustion engine estimated by the torque estimation means increases with an increase in the rotational fluctuation of the frequency component derived from the filtering process performed by the rotation synchronization filtering means.

3. The internal combustion engine torque estimation device according to claim 1, wherein the rotational fluctuation acquisition means includes output interval calculation means for calculating output intervals at which the reference signal is output; rotation speed calculation means for calculating the rotation speed of the crank angle in accordance with the output intervals; and rotational change amount calculation means for calculating the amount of change in the rotation speed of the crankshaft.

4. The internal combustion engine torque estimation device according to claim 1, wherein the frequency component removed by the rotation synchronization filtering means contains a frequency component of torque that is generated due to disturbance during a vehicle run.

5. The internal combustion engine torque estimation device according to claim 1, wherein the frequency component removed by the rotation synchronization filtering means contains a frequency component of torque that is generated due to mechanical friction in the internal combustion engine.

6. The internal combustion engine torque estimation device according to claim 1, further comprising:

first inhibition means for inhibiting the torque estimation means from estimating torque when an automatic transmission with a torque converter having a lock-up function, which is coupled to an output shaft of the internal combustion engine, is locked up.

7. The internal combustion engine torque estimation device according to claim 1, further comprising:

second inhibition means for inhibiting the torque estimation means from estimating torque when ignition timing is retarded by an ignition device, which is provided for the internal combustion engine and capable of controlling the ignition timing.

8. An internal combustion engine torque estimation device comprising:

a reference signal acquisition device for acquiring a reference signal that is output at predetermined rotation angle intervals of a crankshaft for an internal combustion engine;

a rotational fluctuation acquisition device for acquiring a rotation speed change amount of the internal combustion engine as a rotational fluctuation in accordance with the reference signal;

a rotation synchronization filtering device for extracting a frequency component synchronized with a combustion cycle of the internal combustion engine by performing a filtering process on the rotational fluctuation in synchronism with the output timing of the reference signal; and a torque estimation device for estimating the torque of the internal combustion engine in accordance with the frequency component extracted by the rotation synchronization filtering device.

* * * * *